United States Patent [19]
Han et al.

[11] Patent Number: 5,657,950
[45] Date of Patent: Aug. 19, 1997

[54] BACKWARD-LEANING-MOVEMENT SEAT LEG STRUCTURE

[75] Inventors: Wei-Kuo Han; Chung-Hsiung Cheng, both of Hsinchu, Taiwan

[73] Assignee: Industrial Technology Research Intitute, Taipei, Taiwan

[21] Appl. No.: 515,041

[22] Filed: Aug. 14, 1995

[51] Int. Cl.$^6$ .................................................. B64D 11/06
[52] U.S. Cl. ............................... 244/122 R; 297/216.2
[58] Field of Search ........................... 244/122 R, 121, 244/118.5, 118.6; 297/216.2, 216.1, 216.11, 216.15, 216.16; 248/503.1; 296/65.1

[56] References Cited

U.S. PATENT DOCUMENTS

| | | | |
|---|---|---|---|
| 3,603,638 | 9/1971 | McGregor | 297/216.2 |
| 4,150,805 | 4/1979 | Mazelsky | 297/216.1 |
| 4,911,381 | 3/1990 | Cannon et al. | 244/122 R |
| 5,152,578 | 10/1992 | Kiguchi | 244/122 R |
| 5,320,308 | 6/1994 | Bilezikjian | 244/122 R |
| 5,531,404 | 7/1996 | Marechal | 244/122 R |

*Primary Examiner*—Galen L. Barefoot
*Attorney, Agent, or Firm*—Michael D. Bednarek; Kilpatrick Stockton LLP

[57] ABSTRACT

A backward-leaning-movement seat leg structure is provided for attaching a seat to the floor of a vehicle or an aircraft. The backward-leaning-movement seat leg structure comprises a framework having a front beam; a rear beam parallel to the front beam; and a plurality of spreaders perpendicularly connected to the front beam and the rear beam; a rear leg being substantially arcuate and comprising a first segment pivotally connected to the rear beam and a second segment pivotally attached to the floor; an energy absorber comprising a sleeve pivotally connected to the rear leg; and an inner bar extending out from the sleeve; a rotatable arm comprising a first end fixedly connected to the front beam; and a second end pivotally connected to the inner bar of the energy absorber; a front leg comprising a third end pivotally connected to the rotatable arm between the first end and the second end; and a fourth end pivotally attached to the floor; a first fuse pin inserted through the rotatable arm and the inner bar of the energy absorber to prevent the rotatable arm from rotating relative to the inner bar; and a second fuse pin inserted through the sleeve and the inner bar to prevent the inner bar from travelling relative to the sleeve.

8 Claims, 5 Drawing Sheets

BACKWARD-LEANING-MOVEMENT SEAT LEG STRUCTURE

BACKGROUND OF THE INVENTION

1. Field of the Invention

The present invention relates to a seat leg structure. More particularly, the present invention relates to a backward-leaning-movement seat leg structure.

2. Description of the Prior Art

An emergency landing or an improper landing by an aircraft can easily result in a strong shock and impact. If the aircraft shock-absorbing system can not entirely absorb the impact force, some impact energy will be transmitted to its structure and even to passengers inside. Therefore, airplane seats generally have an impact-absorbing function to protect passengers from injury.

U.S. Pat. No. 4,911,381 discloses an aircraft seat, as shown in FIG. 1, in which the numbers 100 and 200 respectively represent a seat portion and an energy absorber. Under a strong impact force, the aircraft seat legs rotate so that the seat portion 100 moves from position BC to position $B_1C_1$. At the same time the energy absorber 200 extends and absorbs impact energy to protect the passenger.

However, research studies have shown that there is another potential danger. Under an impact force, the seat portion 100 rotates counterclockwise at an angle $\alpha$ and therefore leans forward. A passenger in the seat portion 100 also rotates counterclockwise so that his lap fails to obstruct his body from bending forward. In addition, the seat portion 100 moves forward in a horizontal displacement d. As a possible result, his head moves forward too much and collides against other objects.

SUMMARY OF THE INVENTION

An object of the present invention is to provide a backward-leaning-movement seat leg structure which can protect the head of a passenger from collision with other objects under a strong impact.

In accordance with the object of the present invention, there is provided a backward-leaning-movement seat leg structure for attaching a seat to the floor of an aircraft. The backward-leaning-movement seat leg structure comprises:

- a framework consisting of a front beam; a rear beam parallel to the front beam; and a plurality of spreaders perpendicularly connected to the front beam and the rear beam;
- a rear leg being substantially arcuate and comprising a first segment pivotally connected to the rear beam and a second segment pivotally attached to the floor;
- an energy absorber comprising a sleeve pivotally connected to the rear leg; and an inner bar extending out from the sleeve;
- a rotatable arm comprising a first end fixedly connected to the front beam; and a second end pivotally connected to the inner bar of the energy absorber;
- a front leg comprising a third end pivotally connected to the middle of the rotatable arm; and a fourth end pivotally attached to the floor;
- a first fuse pin which is inserted through the rotatable arm and the inner bar of the energy absorber to prevent the rotatable arm from rotating relative to the inner bar and which can be cut off under a predetermined impact force; and
- a second fuse pin which is inserted through the sleeve and the inner bar to prevent the inner bar from travelling relative to the sleeve and which can be cut off under the predetermined impact force.

BRIEF DESCRIPTION OF THE DRAWINGS

The object, features and advantages of the present invention will become apparent by way of the following detailed description of the preferred but non-limiting embodiment. The description is made with reference to the accompanying drawings, wherein.

DESCRIPTION OF THE PREFERRED EMBODIMENT

Figure 1:
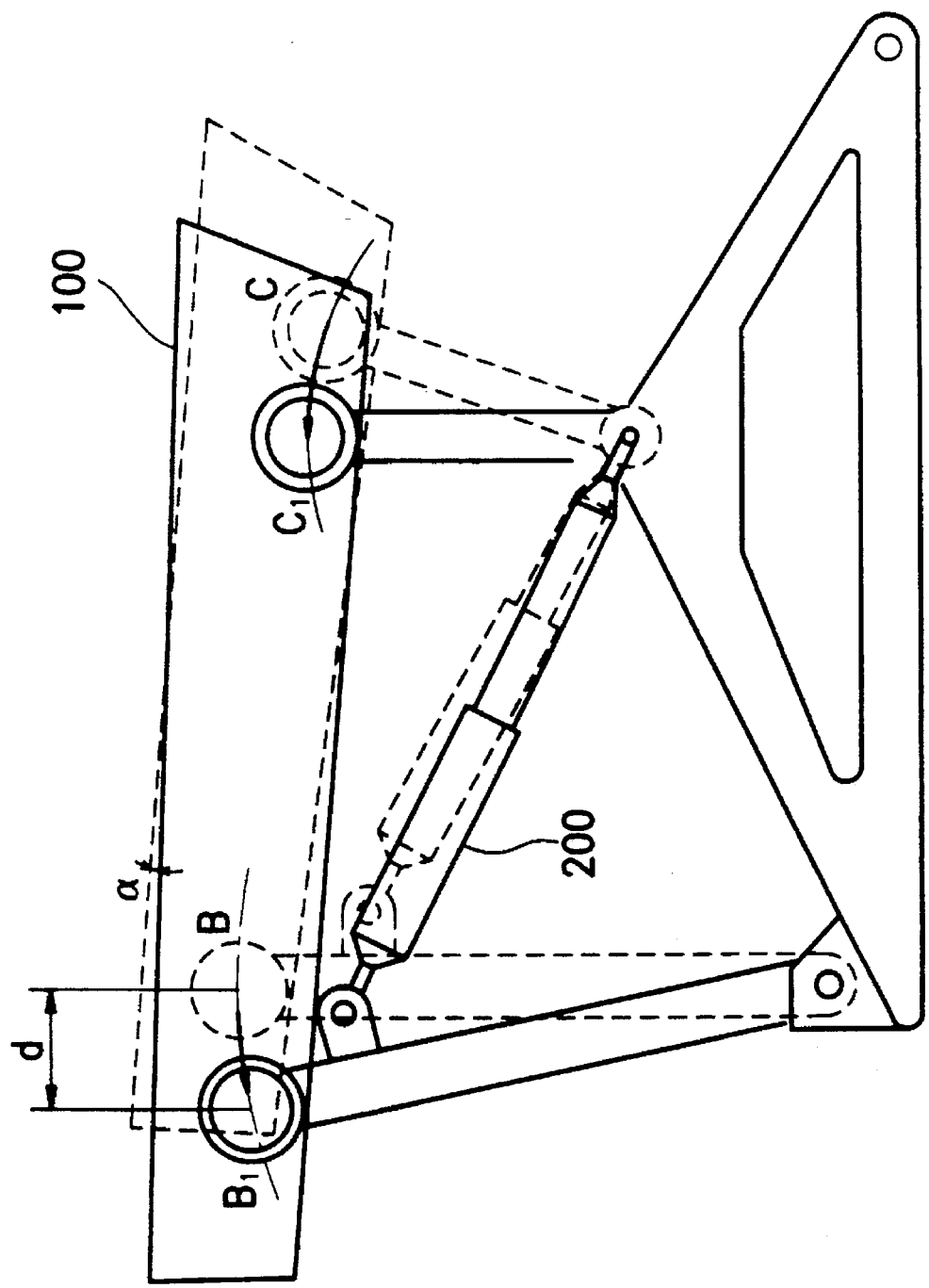
FIG. 1 is a side view of aircraft seat leg structure according to U.S. Pat. No. 4,911,381 before and after an impact force was exerted thereon.
Figure 2:
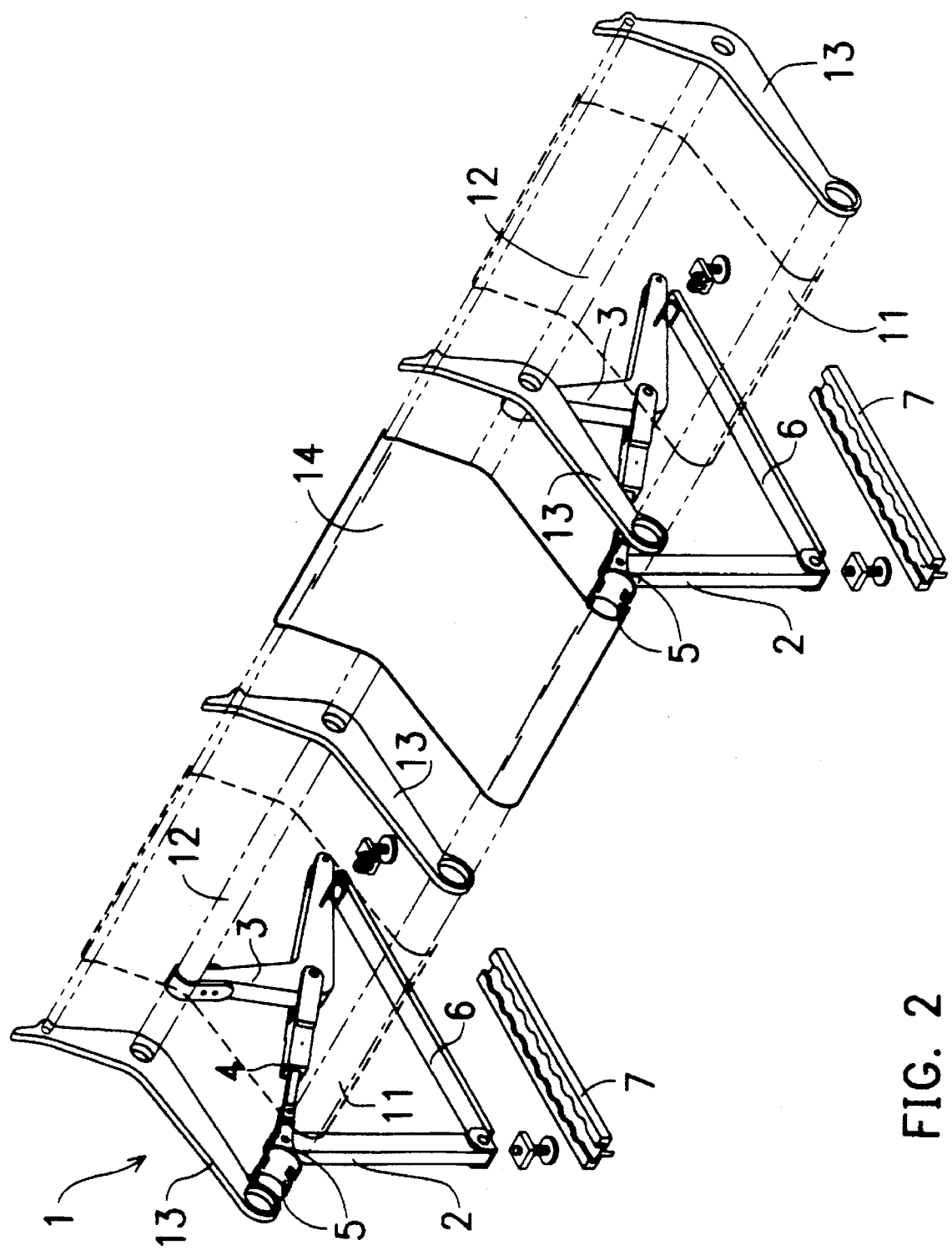
FIG. 2 shows the seat tracks of an aircraft and backward-leaning-movement seat leg structure according to the present invention.

Please refer to FIG. 2. A seat leg structure according to the present invention is provided for attaching seats (not shown) to seat tracks 7 which are set on the floor of an aircraft cabin. The seat leg structure comprises a framework 1, a front leg 2, a rear leg 3, an energy absorber 4, a rotatable arm 5, a floor beam 6, a bracket 8, a front track fitting 9 and a rear track fitting 10.

The framework 1 comprises a front beam 11, a rear beam 12 parallel to the front beam 11 and a plurality of spreaders 13 perpendicularly connected to the front beam 11 and the rear beam 12. The framework 1 is used for supporting a plurality of seat plates 14.

Figure 3:
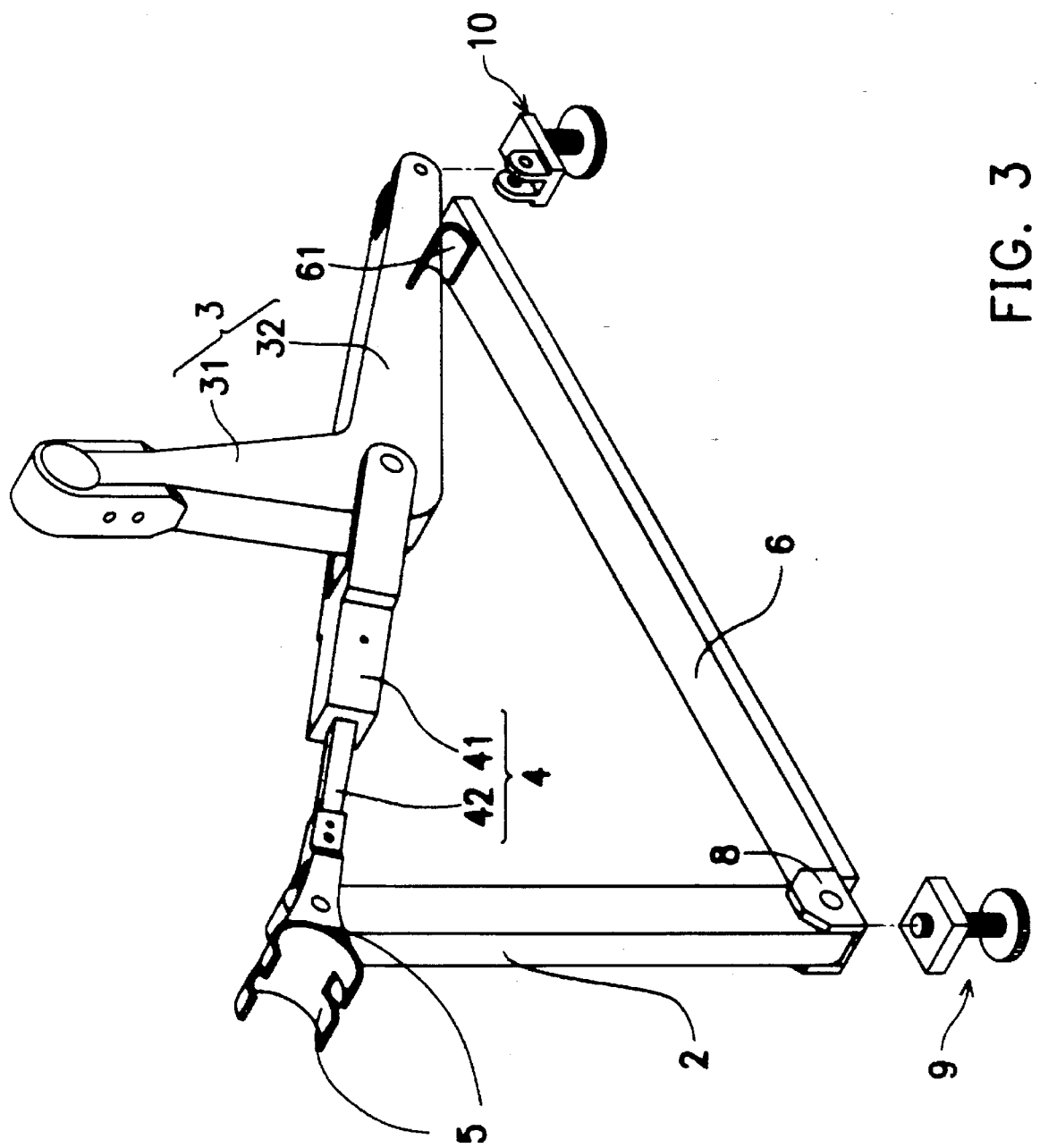
FIG. 3 is a perspective diagram of backward-leaning-movement seat leg structure according to the present invention.

Please refer to FIG. 3, which depicts one end of the floor beam 6 fixedly connected to the bracket 8 and the other end extending to form a bent portion 61. The rear leg 3, which is substantially arcuate and is integrally formed, comprises a first segment 31 pivotally connected to the rear beam 12 and a second segment 32 pivotally connected to the rear track fitting 10. It is noted that the first segment 31 is perpendicular to the cabin floor and the second segment 32 touches the bent portion 61.

The energy absorber 4 comprises a sleeve 41 and an inner bar 42. The sleeve 41 is pivotally connected to the location where the first segment 31 and the second segment 32 are joined together. The inner bar 42 extends out from the sleeve 41 and is pivotally connected to the rotatable arm 5. The energy absorber 4 is a tension-type energy absorber. That is, the inner bar 42 can be pulled out to consume external energy when an external force is exerted on the energy absorber 4.

The rotatable arm 5 has a first end fixedly connected to the front beam 11 and a second end pivotally connected to the inner bar 42. The rotatable arm 5, the energy absorber 4 and the second segment 32 of the rear leg 3 are arranged in a straight line.

The front leg 2 has a third end and a fourth end. The third end is pivotally connected to the middle of the rotatable arm 5, while the fourth end is pivotally connected to the bracket 8.

The front track fitting 9 fixedly connects the bracket 8 to the seat track 7. The rear track fitting 10 is mounted between the seat track 7 and the second segment 32 of the rear leg 3 wherein the rear track fitting 10 is fixedly connected to the seat track 7 and the second segment 32 is pivotally connected to the rear track fitting 10.

Figure 4:
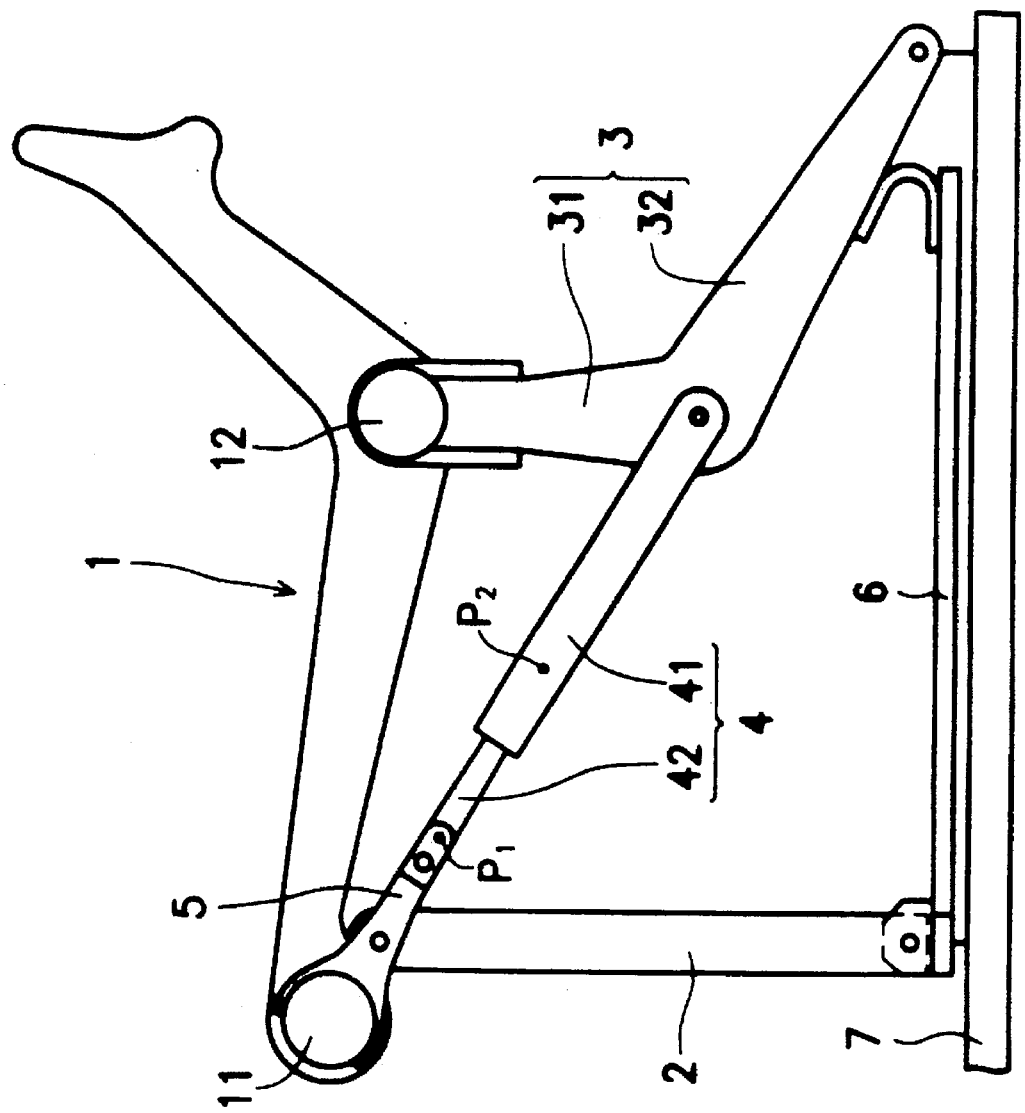
FIG. 4 is a side view of backward-leaning-movement seat leg structure according to the present invention.

Please refer to FIG. 4, depicting a first fuse pin $P_1$ inserted through the rotatable arm 5 and the inner bar 42, beside their pivoted point 54, to prevent them 5, 42 from rotating. Also, a second fuse pin $P_2$ is inserted through the sleeve 41 and the inner bar 42 to prevent them 41, 42 from relative travelling. As a result, the seat leg structure is constrained to keep the attitude shown in FIG. 4 by way of the first fuse pin $P_1$ and the second fuse pin $P_2$.

Figure 5:
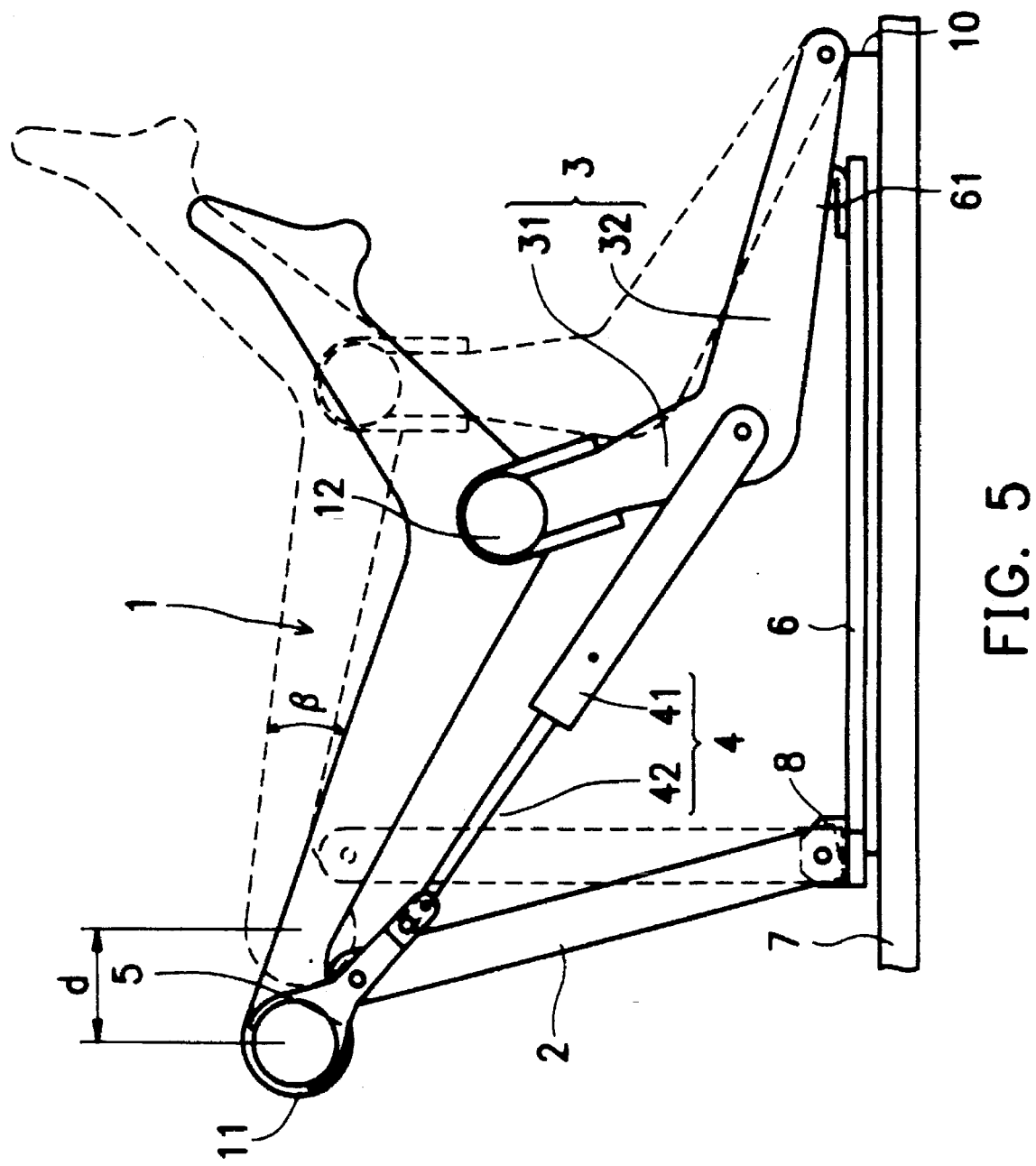
FIG. 5 is a side view of backward-leaning-movement seat leg structure according to the present invention before and after an impact force has been exerted thereon.

When an accident occurs, a strong impact force pushes the seat leg structure forward. The first fuse pin $P_1$ and the second fuse pin $P_2$ are cut off and the member constraint is thus released. In FIG. 5, the dotted lines and the full lines respectively show the seat leg structure before and after the impact force applied thereon. The front leg 2 and the rear leg 3 rotate counterclockwise about the bracket 8 and the rear track fitting 9, respectively. The bent portion 61 which touches the rear leg 3 is pressed and deforms. The rotatable arm 5 rotates clockwise using the front leg 2 as a fulcrum. The inner bar 42 of the energy absorber 4 is pulled out to absorb impact energy.

Focusing on the attitude of the framework 1 in greater details, when an accident occurs, the rear leg 3 rotates counterclockwise about the rear track fitting 10 so that the rear beam 12 descends. Also, the front leg 2 rotates counterclockwise about the bracket 8 so that the third end of the front leg 2 pivotally connected to the rotatable arm 5 descends. At the same time, however, the rotatable arm 5 rotates clockwise so that the front beam 11 ascends. The ascending front beam 11 and the descending rear beam 12 make the framework 1 lean backward at a large angle β to reduce the forward displacement of the head of the passenger. The purpose of protecting passengers is thus achieved.

The present invention can also be applied to vehicles although a seat leg structure for aircraft is described in the above preferred embodiment. It is understood that some necessary modifications can easily be accomplished by those skilled in the art. Accordingly, the scope of the invention should be determined by the appended claims and not by the specific examples given.

What is claimed:

1. A backward-leaning-movement seat leg structure for attaching a seat to the floor of a vehicle or an aircraft, comprising:

a framework having a front beam; a rear beam parallel to said front beam; and a plurality of spreaders perpendicularly connected to said front beam and said rear beam;

a rear leg being substantially arcuate and comprising a first segment pivotally connected to said rear beam and a second segment pivotally attached to said floor;

an energy absorber comprising a sleeve pivotally connected to said rear leg; and an inner bar extending out from said sleeve;

a rotatable arm comprising a first end fixedly connected to said front beam; and a second end pivotally connected to said inner bar;

a front leg comprising a third end pivotally connected to said rotatable arm between said first end and said second end; and a fourth end pivotally attached to said floor;

a first fuse pin which is inserted through said rotatable arm and said inner bar to prevent said rotatable arm from rotating relative to said inner bar and which can be cut off under a predetermined impact force; and a second fuse pin which is inserted through said sleeve and said inner bar to prevent said inner bar from travelling relative to said rear beam and which can be cut off under said predetermined impact force.

2. A backward-leaning-movement seat leg structure as claimed in claim 1, wherein said sleeve is pivotally connected to the location where said first segment and said second segment of said rear leg are joined together.

3. A backward-leaning-movement seat leg structure as claimed in claim 2, wherein said first segment and said second segment of said rear leg are integrally formed.

4. A backward-leaning-movement seat leg structure as claimed in claim 2, wherein said first segment of said rear leg is perpendicular to said floor.

5. A backward-leaning-movement seat leg structure as claimed in claim 4, wherein said rotatable arm, said energy absorber and said second segment of said rear leg are arranged in a straight line.

6. A backward-leaning-movement seat leg structure as claimed in claim 1, further comprising a bracket mounted between said floor and said fourth end of said front leg wherein said bracket is fixedly attached to said floor and said fourth end of said front leg is pivotally connected to said bracket; and a floor beam, one end of which is fixedly connected to said bracket and the other end of which forms a bent portion to touch said second segment of said rear leg.

7. A backward-leaning-movement seat leg structure as claimed in claim 6, wherein said floor is further provided with a seat track.

8. A backward-leaning-movement seat leg structure as claimed in claim 7, further comprising a front track fitting which fixedly connects said bracket and said seat track; and a rear track fitting mounted between said seat track and said second segment of said rear leg wherein said rear track fitting is fixedly connected to said seat track and said second segment is pivotally connected to said rear track fitting.

* * * * *